US012701594B2

(12) United States Patent
Rossl

(10) Patent No.:  US 12,701,594 B2
(45) Date of Patent:     Aug. 4, 2026

(54) METHOD FOR RADIO CHANNEL ASSIGNMENT IN AN ELECTRONIC DISPLAY SYSTEM

(71) Applicant: VusionGroup GmbH, Fernitz-Mellach (AT)

(72) Inventor: Andreas Rossl, Fernitz-Mellach (AT)

(73) Assignee: VusionGroup GmbH, Fernitz-Mellach (AT)

( * ) Notice: Subject to any disclaimer, the term of this patent is extended or adjusted under 35 U.S.C. 154(b) by 565 days.

(21) Appl. No.: 18/252,545

(22) PCT Filed: Nov. 12, 2020

(86) PCT No.: PCT/EP2020/081976
§ 371 (c)(1),
(2) Date: May 11, 2023

(87) PCT Pub. No.: WO2022/100840
PCT Pub. Date: May 19, 2022

(65) Prior Publication Data
US 2024/0023147 A1     Jan. 18, 2024

(51) Int. Cl.
*H04W 72/52*     (2023.01)
*H04W 72/0446*     (2023.01)
*H04W 72/0453*     (2023.01)

(52) U.S. Cl.
CPC ....... *H04W 72/52* (2023.01); *H04W 72/0446* (2013.01); *H04W 72/0453* (2013.01)

(58) Field of Classification Search
CPC ............. H04W 72/52; H04W 72/0446; H04W 72/0453; H04W 16/18; H04W 72/542; H04W 16/04
See application file for complete search history.

(56) References Cited

U.S. PATENT DOCUMENTS 5,475,868  A  *  12/1995  Duque-Anton  .......  H04W 16/04
                                                                          455/452.2
2002/0060995  A1    5/2002  Cervello
(Continued)

FOREIGN PATENT DOCUMENTS

CN         110300395  A      10/2019
EP           0585994  A2       3/1994
(Continued)

OTHER PUBLICATIONS

An Office Action mailed by China National Intellectual Property Administration on Jul. 7, 2025, which corresponds to Chinese Patent Application No. 202080107143.6 and is related to U.S. Appl. No. 18/252,545.

(Continued)

*Primary Examiner* — Rina C Pancholi
(74) *Attorney, Agent, or Firm* — Studebaker Brackett PLLC

(57)          ABSTRACT

The invention relates to a method for radio channel assignment in a system of electronic displays, the system comprising a data processing device, communication stations and electronic displays, and each communication station being designed to use a radio channel defined by the data processing device for radio communication with electronic displays allocated thereto, the method comprising the following method steps, specifically: defining the radio channel to be used on the basis of radio channel activity data which are transmitted by the communication station to the data processing device and describe a detected radio activity in the radio channel in question, characterised in that the communication station transmits the radio channel activity data at a time after the communication station in question has established an initial connection with at least one of the electronic displays by using a radio channel, wherein the (Continued)

radio channel activity data describe a detected radio activity after said initial connection has been established.

19 Claims, 4 Drawing Sheets

(56) References Cited

U.S. PATENT DOCUMENTS

| | | | | |
|---|---|---|---|---|
| 2015/0296383 A1* | 10/2015 | Choi | ..................... | H04W 16/14 |
| | | | | 370/252 |
| 2017/0011238 A1* | 1/2017 | Rößl | ..................... | G06Q 30/02 |
| 2018/0010785 A1 | 1/2018 | Lee | | |
| 2018/0107850 A1* | 4/2018 | Rößl | ..................... | G06Q 30/02 |

FOREIGN PATENT DOCUMENTS

| | | | |
|---|---|---|---|
| EP | 2993950 A1 | 3/2016 |
| JP | 2014-175784 A | 9/2014 |
| JP | 2017-507598 A | 3/2017 |

OTHER PUBLICATIONS

International search report from WO Publication WO 2022/100840 A1 the Parent of the present application.

An Office Action mailed by China National Intellectual Property Administration on Feb. 14, 2025, which corresponds to Chinese Patent Application No. 202080107143.6 and is related to U.S. Appl. No. 18/252,545; with English language translation.

An Office Action; "Notice of Reasons for Refusal," mailed by the Japanese Patent Office on Jul. 3, 2024, which corresponds to Japanese Patent Application No. 2023-528264 and is related to U.S. Appl. No. 18/252,545; with English language translation.

"Notice of Reasons for Refusal" Office Action issued in JP 2023-528264; mailed by the Japanese Patent Office on Dec. 18, 2024.

An Office Action mailed by China National Intellectual Property Administration on Mar. 30, 2026, which corresponds to Chinese Patent Application No. 202080107143.6 and is related to U.S. Appl. No. 18/252,545; with English language translation.

* cited by examiner

1

METHOD FOR RADIO CHANNEL ASSIGNMENT IN AN ELECTRONIC DISPLAY SYSTEM

CROSS-REFERENCE TO RELATED APPLICATIONS

This is a 35 U.S.C. 371 National Stage Patent Application of International Application No. PCT/EP2020/081976, filed Nov. 12, 2020, which is hereby incorporated by reference in its entirety.

TECHNICAL FIELD

The invention relates to a method for radio channel assignment in an electronic display system and to an electronic display system in which such a method is used and which is designed for the use of such a method.

BACKGROUND

A method for radio channel assignment in an electronic shelf label system (ESL system for short) is known from KR20140014540A, for example. Said document describes a heterogeneous radio system in which ZigBee radio communication is used in the ESL system and Wi-Fi radio communication also takes place in the same frequency band. This can lead to interference in the radio traffic, in particular in the ESL system.

The ESL system comprises a plurality of gateway units, which are connected to a central management server unit and also handle said ZigBee radio communication with a group of electronic shelf labels (ESLs for short) in each case.

To solve the problem of said interference in the radio traffic, it is provided for each gateway unit to provide radio channel use information relating to the radio channel use of one or more channels and also position information relating to the position of the gateway unit in question and to transmit said information to the management server unit. Based on this, the management server unit defines, for each gateway unit, a preferred radio channel which is used for establishing a connection to the ESLs. This ensures that, for the radio connection between the gateway unit in question and the ESLs, a ZigBee radio channel is used which does not correspond to a Wi-Fi radio channel in use and has the best reception sensitivity. It is also ensured that adjacent gateway units use different ZigBee radio channels.

In the known method for radio channel assignment, it has been found disadvantageous that changes cannot be made in the ESL system or in the Wi-Fi system during operation of the ESL system. In addition, the proposed use of GPS inside buildings, such as business premises, in which ESL systems are usually installed, for the purpose of determining the position of the gateway unit in question is questionable.

The object of the invention is therefore to provide an improved method for radio channel assignment in an ESL system and an improved ESL system in which such a method is used and which is designed for the use of such a method, so that the problems discussed are avoided.

SUMMARY OF THE INVENTION

This object is achieved by means of a method according to claim 1. The subject matter of the invention is therefore a method for radio channel assignment in a system of electronic displays, the system comprising a data processing device, communication stations and electronic displays, and each communication station being designed to use a radio channel defined by the data processing device for radio communication with electronic displays allocated thereto, the method comprising the following method steps, specifically: defining the radio channel to be used on the basis of radio channel activity data which are transmitted by the communication station to the data processing device and describe a detected radio activity in the radio channel in question, characterised in that the communication station transmits the radio channel activity data at a time after the communication station in question has established an initial connection with at least one of the electronic displays by using a radio channel, wherein the radio channel activity data describe a detected radio activity after said initial connection has been established.

This object is also achieved by an electronic display system according to claim 16. The subject matter of the invention is therefore an electronic display system which comprises electronic displays; communication stations, each communication station being designed to use a defined radio channel for radio communication with electronic displays allocated to the communication station; and a data processing device which is designed to define the radio channel to be used by the communication station in question on the basis of radio channel activity data which are transmitted by the communication stations to the data processing device and describe a radio activity in the radio channel in question, characterised in that the communication stations are designed to transmit the radio channel activity data at a time after the communication station in question has established an initial connection with at least one of the electronic displays by using a radio channel, wherein the radio channel activity data describe a detected radio activity after said initial connection has been established.

This object is also achieved by the use according to claim 17. The subject matter of the invention is therefore the use of communication stations in an electronic display system which comprises electronic displays, for transmitting radio channel activity data which describe a radio activity in the radio channel in question to a data processing device which is designed to define the radio channel to be used by the communication station in question for communication with electronic displays allocated thereto on the basis of the transmitted radio channel activity data, characterised in that the communication station is used to transmit the radio channel activity data at a time after the communication station in question has established an initial connection with at least one of the electronic displays by using a radio channel, wherein the radio channel activity data describe a detected radio activity after said initial connection has been established.

The measures according to the invention are used in an electronic display system which is installed for example in business premises of a retailer. In said premises there are electronic displays which are designed to display product information and/or price information for the product. These electronic displays are for example attached to product packaging, attached to the front edges of shelves, or else erected on product presentation tables or even fastened to items of clothing.

A further part of the system is a data processing device which is implemented by a computer, in particular server, installed on site and a software application run thereon, the software application managing or providing the visible information presented with the aid of the electronic displays and digitally mapping the business premises, the products and their position and the electronic display associated with the product in question (and therefore also the position of these displays) in a so-called planogram. The data processing device can also be implemented partially or fully by cloud-based software, which is then provided and run on suitable computers in a data centre and is connected to the infrastructure of the electronic display system via the Internet.

A further part of the system is formed by multiple communication stations, which are also referred to as access point or gateway units for the electronic displays, distributed within the business premises. They are connected for example to the data processing device via a WLAN or else a wired connection and are used for radio communication with the electronic displays. During operation of the system, a group of the electronic displays is logically allocated to a single communication station, which means that the electronic displays have been registered during their commissioning at the communication station from which they can receive the strongest radio signal in a substantially interference-free manner in one of the available radio channels. The communication stations then only communicate, in particular without measures changing the allocation of the electronic displays, with the electronic displays registered with them and can exchange data between the data processing device and the electronic displays and thereby retrieve state information from the electronic displays or else change the image content of the screens of the electronic display.

The measures according to the invention have the advantage that the radio channel assignment can be automatically adapted even after the initial registration of the electronic displays at the respective communication stations, that is, after initial commissioning of the electronic display system. This makes it possible for the communication stations in the electronic display system, even during operation of the system, to be operated automatically in the radio channels, which may also change over time, in which there is the least interference from other communication stations but also other devices communicating by radio which do not belong to the system. The allocation of the radio channels can therefore be changed, in a manner adapted to the radio activity actually present in the respective radio channel, in order to ensure interference-free radio operation, even during operation.

Further, particularly advantageous embodiments and developments of the invention can be found in the dependent claims and the description below. In connection with the different categories of claims, it should be mentioned at this point that advantages and effects presented in conjunction with the claims of one category are also present or applicable to the measures of the other claim category adapted to the claim category in question.

To obtain a detected radio activity in the radio channel in question, it is first necessary to detect the radio activity in the relevant radio channel. This can be done in different ways, as explained in detail below.

For example, the radio activity in a radio channel can be detected with the aid of the communication station at the location of the communication station in question.

Since different radio channels of a frequency band are available for communication in the electronic display system, the radio activity can take place for multiple, preferably predefined, radio channels. This can also include radio channels which are not directly used by the electronic display system for communication between the communication stations and the electronic displays. Preferably, however, in particular only the radio channels which are predefined for use by the electronic displays are taken into account, in order to limit or minimise outlay on detection.

To detect the radio activity, the communication station selects a radio channel and receives, in this radio channel, any radio signals which may be present. If such radio signals are present, the corresponding radio channel activity data describe the detected radio activity in the relevant radio channel such that they, for example, represent information about the signal strength of the received radio signals and/or contain information relating to the origin of the radio signals, insofar as this is possible on the basis of the nature of the radio signal and its information content. For the sake of completeness, it should be mentioned at this point that if determined radio signals are absent, the communication station simply receives only noise, and in this case the corresponding radio channel activity data describe the relevant radio channel as unused.

The communication stations are usually fastened in business premises, for example fixed to the ceiling of the business premises, and positioned with a suitable distance from one another, so that each communication station can have radio coverage of a room region of the business premises for communication with the electronic displays allocated to the communication station. Since the positions of the communication stations are known, this measure allows a correspondingly rough detection of the radio activity for the room region in question, in the centre of which the communication station is located, to be carried out, in which of course only the radio signals arriving at the location of the communication station can actually be detected by same.

The detected radio activity can for example relate to or describe the radio activity of other communication stations which are arranged at a distance from the communication station in question and use the same radio channel as the communication station in question. Such other communication stations can be identified relatively easily as parts of the electronic display system because they transmit according to an unambiguous communication protocol fundamentally known in the electronic display system. They can also be identifiable using unambiguously identifiable data or data structures.

The detected radio activity can however also be caused by other devices communicating by radio such as WLAN access points positioned in the business premises. Even if such WLAN access points communicate by radio in radio channels other than the radio channel for which the communication station is currently in receive mode, the occurring WLAN radio signal sidebands can interfere with communication between the communication station and the electronic displays allocated thereto. This applies in particular to communication from the electronic displays which are in transmit mode towards the communication station which is in receive mode. In this situation, it is possible for sidebands originating from the radio communication caused by WLAN access points and extending into an ESL radio channel dominate in the ESL radio channel in comparison with the radio signals emitted by an electronic display. This can make it impossible for the communication station to receive the radio signals emitted by the electronic displays and thus significantly impede radio traffic between the communication station and the electronic displays allocated thereto.

The WLAN access points can be spatially isolated from the communication stations of the electronic display system. In contrast, according to a specific embodiment of the communication station, the communication station can comprise a first radio communication module for radio communication with the electronic displays according to a first communication protocol, and a second radio communication module for radio communication according to a second communication protocol, different from the first communication protocol, for radio communication with devices other than the electronic displays. In this specific embodiment of the communication station, it is in fact a combination communication station in which the different radio communication modules are combined or integrated in one device or device housing. Such a communication station can comprise an ESL communication module as the first radio communication module and a WLAN communication module as the second radio communication module, for example. For the sake of completeness, it should be mentioned at this point that the second radio communication module can also be designed to communicate by radio according to a different specification or a different standard, such as ZigBee or Bluetooth etc. In the combination communication station, the two communication modules can in principle be implemented by structurally or physically separate electronic components. Preferably, however, the combination communication station comprises a unitary, that is, jointly used, computerised hardware platform for both communication modules, on which hardware platform two different software drivers implementing the function of the respective communication module are installed and run in order to implement the different functionalities, in particular communication protocols, of the two communication modules. Furthermore, the combination communication station can comprise two differently designed transmitting and receiving units, which are coupled to the common hardware platform, each of the transmitting and receiving units forming a physical radio interface for the respective communication module. These units can comprise for example electronics specific to the communication module, which comprise for example modulators and demodulators as well as antennas or antenna oscillating circuits and the like.

In this configuration, the communication station, in this case the ESL communication module, does not have to receive any radio signals in order to detect the radio activity of the WLAN communication module, for example, integrated in the combination communication station. Rather, the integration of the two communication modules in one device allows the radio activity to be detected at the first radio communication module by querying the radio channel use from the second radio communication module via a hardware interface and/or software interface (inside the combination communication station).

A wide variety of variants of communication stations can be installed in business premises, for example a number of the discussed combination communication stations and another number of "simple" communication stations which are used only for radio communication with the electronic displays.

Irrespective of how the radio activity is actually detected, the radio activities detected by the different communication stations in the radio channel in question are transmitted by the communication stations as the radio channel activity data to the central data processing device.

For the communication stations which are combination communication stations, the data processing device defines both a first radio channel to be used by the first radio communication module and a second radio channel to be used by the second radio communication module, which second radio channel substantially does not overlap with the first radio channel, in particular also taking into account sidebands. Therefore, it is possible in a simple manner not only to implement a centrally controlled radio channel assignment for the "simple" communication stations but also to centrally control the radio channel assignment of the ESL communication modules and the WLAN communication modules in the combination communication stations, adapt it continually if necessary, and thus also optimise it over time. This is done primarily also taking into account the radio channels to be used by the "simple" ESL communication stations and the ESL communication modules installed in the combination communication stations, so that largely interference-free ESL radio traffic is automatically ensured, in particular despite the extreme spatial closeness of the different communication modules inside the combination communication station.

However, if only the respective communication station is used to detect the radio activity at the respective location of the communication station, conclusions about radio activities present further away from the communication station or in the edge region of the respective room region within radio coverage can be drawn only roughly or not at all. In particular, no statements can be made about the actual radio activity at the location of the respective electronic display allocated to the relevant communication station. These electronic displays are distributed in the business premises according to the respective topology (arrangement of shelving and shelf rails or shelves to which they are fastened) within the room region within radio coverage of the communication station in question. Since their radio signals usually have the lowest transmitting power, it is precisely the electronic displays whose radio signals are impaired by radio interference signals in the radio channel used by them.

Therefore, it has proven particularly advantageous that a radio activity in a radio channel is detected with the aid of an electronic display at the location of the electronic display in question, and the radio activity present at the location of the electronic display in question is transmitted to the data processing device as radio channel activity data together with a display identifier identifying the electronic display in question via the communication station to which the relevant electronic display is allocated. With this measure, the radio activity can be determined at the respective location of the relevant electronic display with a high degree of relevance. It should be emphasised that no further supporting measures, such as manual measurements of the radio activity in the business premises, are necessary for this. Rather, the electronic displays themselves are used as on-site sensors for detecting the radio activity.

Particularly preferably, the radio communication between one of the communication stations and the electronic displays allocated thereto takes place according to a time slot communication method, in which, in a repeating sequence, a number of time slots per time slot cycle, in particular a fixed number, is available for communication between the communication station and the electronic displays allocated thereto, and each time slot is labelled with a unique time slot symbol, wherein, owing to the use of the time slot symbol, each electronic display is allocated exactly one time slot in order to autonomously establish synchronism with the communication station and to communicate with the communication station as required. In this case, it has proven particularly advantageous that a radio activity in a radio channel is detected with the aid of an electronic display during a time slot. This measure has the advantageous effect that the times or time ranges, which can correspond substantially to the time slots, of the detection of the radio activity are defined exactly by the in principle rigid structure of the time slot communication method. The electronic displays therefore do not have to leave the strict timing of the time slot communication method but can carry out the detection of the radio activity in their state synchronous with the relevant communication station. A resynchronisation, which is relatively energy-intensive and otherwise necessary after the detection of the radio activity, can therefore be omitted, which has a positive effect on the service life of the energy store, for example the battery, of the electronic displays.

Preferably, a proprietary time slot communication method is used, in which, for example, m time slots, e.g. 255 time slots, are used in a repeating sequence within n seconds, e.g. 15 seconds. The n seconds form a time slot cycle. In this time slot communication method, therefore, m time slots are available within one time slot cycle for communication with the electronic displays. Each of the electronic displays can be allocated to one of the time slots, wherein a certain time slot can also be allocated multiple electronic displays.

Each electronic display comprises substantially one radio communication stage, also called transceiver, and a logic stage interacting therewith, which provides logic functions of the electronic display. The logic stage can for example be fully implemented by means of hardware or comprise a microprocessor and memory chips or a microcontroller with integrated memory chips so that software stored in the memory chips can be run. The electronic display can receive a radio signal with the aid of its radio communication stage, process receive data in the radio signal with the aid of the logic stage, and where necessary generate response data with the aid of the logic stage and output said response data again via its radio communication stage as a radio signal. The radio communication stage comprises means for radio communication and for converting analogue signals into digital signals and vice versa. This can be a modulator, a demodulator, an antenna oscillating circuit and an antenna etc.

Such an electronic display can comprise an energy store, such as a battery or a solar panel coupled to a chargeable battery, for its energy supply. It can also be supplied with energy by receiving radio signals, as is known for example from NFC or RFID technology or is also used in the context of "power over Wi-Fi".

In order to operate as energy-efficiently as possible, the electronic displays have different operating states. An electronic display has a relatively high energy consumption in an active state. The active state is present for example during transmission or receipt of data, during display updates, during measurement of battery voltage etc. In a sleep state, however, there is a relatively low energy consumption. Preferably, in the sleep state, as many electronic components as possible are disconnected from the electricity supply or shadowed or at least operated in a mode with the lowest possible energy demand. The active state is present primarily in the time slot determined for the electronic display for communication with the communication station. In the active state, the electronic display is for example ready to receive in order to receive commands and where necessary also receive data from the communication station and to process them with the aid of the logic stage. In the active state, transmit data can also be generated with the aid of the logic stage and communicated to the communication station. Outside the time slot determined for the electronic display, the electronic display is primarily operated in the energy-saving sleep state. In the sleep state, the logic stage or the time control stage carries out only the activities which are necessary for the timing for waking up at the right time so that the electronic display is ready to receive a synchronisation data signal and/or to communicate with the communication station at the next time slot determined for it. In order to operate energy-efficiently and thus achieve the longest possible service life of the electronic display, the fundamental operating strategy consists in keeping the synchronous electronic display in the sleep state for as long as possible and operating it in the active state for the shortest possible time span only when absolutely necessary for the purpose of data transmission with the communication station.

To determine the synchronism with the communication station, it is sufficient for each electronic display which is allocated to the relevant communication station to know about the time slot symbol which indicates the time slot determined for it and is preferably emitted at the start of the time slot as a constituent of the synchronisation data signal. Each of the electronic displays therefore orients itself individually by the occurrence of a time slot symbol relevant to it, identifies the time slot symbol relevant to it, and defines its next wake-up time in order to conform with the timing of the time slot communication method predefined by the communication station. In this case it is completely sufficient for the time slot symbol to identify the respective time slot uniquely, e.g. with a time slot identifier individual to each time slot. Further information encoded into the synchronisation data signal is not necessary to operate an electronic display synchronously with the communication station. The electronic display therefore establishes its synchronism with the communication station autonomously, that is, solely by the fact of detecting the time slot symbol which occurs at the time expected by it or within an expected time window and indicates the time slot defined for it.

After the electronic display has established its synchronism as explained above, it is in principle sufficient for it to change back into the sleep state, because the next wake-up time is automatically known by means of the time slot pattern, known to it, of the time slot communication method. The definition of the new wake-up time can thus be limited to, for example, a time control stage (e.g. a timer) of the electronic display being restarted with the timing parameters already used previously to change from the sleep state to the active state. The electronic display can then change back into the sleep state and stay there until, triggered by the time controller, a wake-up and a change from the sleep state to the active state is carried out again at the new wake-up time in the next time slot cycle. However, the electronic display does not necessarily have to stay in the sleep state for the rest of the time slot determined for it but can also process other tasks in an active state during the time slot or the time slot cycle, such as detecting the radio activity in one or more of the available radio channels.

In connection with the time slot communication method, it is also advantageous that a radio activity in a radio channel is detected with the aid of an electronic display in a time slot which is unused in terms of communication between the communication station and the electronic displays allocated thereto, which also include the electronic display carrying out the detection of the radio activity. This ensures that radio signals can actually be received and identified which are not caused by the communication station to which the detecting electronic display is allocated or by electronic displays allocated to this communication station. There is therefore no communication between said communication station and the electronic displays allocated thereto. Since the data processing device and/or the communication station knows the allocation of the electronic displays belonging to it to the time slots of the time slot communication method provided by the relevant communication station, the group of electronic displays can be deliberately programmed (e.g. by a command) to "listen" for radio signals of other radio devices (other communication stations, electronic displays outside the group of the relevant communication station, WLAN router etc.) using a time slot which is free of its own communication in the near future and in which there is currently no radio traffic between the communication station and any of the electronic displays allocated thereto. This allows maximum flexibility when using the available time slots to detect the radio activity. However, this also entails an increased energy consumption because the electronic displays must be addressed by radio with a command in their own time slot, that is, must receive and decode the command which prompts them to assume an energy-consuming receiving activity, possibly also in a time slot other than their own time slot, in order to carry out the detection of the radio activity. A suddenly occurring need for communication within the programmed time slot can also mean that an unnecessary detection of the radio activity takes place within this time slot, which of course also entails an unnecessary energy consumption by the detecting electronic displays.

Therefore, it can be particularly advantageous if a radio activity in a radio channel is detected with the aid of an electronic display in a predefined time slot, in particular the last time slot of the time slot cycle. For example, a certain time slot can be pre-reserved by definition in the time slot communication method for the detection of a radio activity. This pre-reserved time slot can be used by, for example, all the electronic displays allocated to a communication station to detect the radio activity without them having to be programmed to do so in an energy-intensive manner with the aid of a command. In principle, any time slot could be pre-reserved for this measure. However, for reasons of simpler management of the available time slots, it has proven advantageous to assign the time slots before the last time slot of the time slot cycle to the electronic displays allocated to a communication station, that is, to allocate the time slots successively to the electronic displays and to use only the last time slot in the sequence of time slots for detecting the radio activity.

Preferably, the radio activity detected at the relevant electronic display for one or more different, preferably predefined, channels is stored with the aid of the radio channel activity data. This has proven advantageous because in radio communication within the electronic display system, multiple channels are available for which the respective radio activity must be clarified. In particular in the embodiment in which the radio activity is detected by the respective (battery-operated) electronic display at its location, it is advantageous to limit the number of radio channels and in particular to take into account only a predefined list of radio channels in order to keep the energy demand for the detection of the radio activity and also for the process of storing the radio channel activity data within limits. Thus, for each electronic display detecting the radio activity in one of the radio channels, a table or in other words a data structure can be built which describes the radio activity which can be established at its location at the time of the detection in the radio channel in question.

The stored radio channel activity data could in principle also be transmitted at the end of the time slot which is used for detecting the radio activity. If, however, a relatively large number of electronic displays are busy detecting in this time slot, this can mean that not all the electronic displays can transmit their stored radio channel activity data within this time slot, because the duration of the time slot is possibly too short to do this.

Therefore, it has proven particularly advantageous that the radio channel activity data stored for the relevant electronic display are transmitted to the communication station in the time slot allocated to the electronic display. The preferred transmission of the radio channel activity data therefore takes place in the time slot belonging to the electronic display in question. When this transmission exactly takes place can depend on the circumstances, and therefore if other processing tasks or else communication tasks are prioritised, the transmission can also take place at a much later time, that is, in future time slot cycles.

However, the detection of the radio activity by one of the communication stations of the ESL system at its respective location also allows further findings.

For example, a distance evaluation can be generated or a local vicinity relationship can be found out which evaluates the distance between the receiving communication station and other communication stations. This evaluation can mean, for example, that the spacing is too small or sufficient.

Since the receiving communication station actually knows the systematics and details of the time slot communication method, it can easily be decided using the received radio signals and their contents whether they are radio signals from ESLs or radio signals from another communication station. Other, specifically transmitting, communication stations of the affected ESL system are known to transmit the synchronisation data signal (also referred to in the technical jargon as the "beacon") with strict regularity, which makes it distinguishable from the ESLs of the ESL system. Also, the communication stations of the ESL system are clearly identifiable by their individual identifier in the ESL system in question.

The knowledge that the established radio activity in the observed radio channel is attributable to a direct reception of the radio signals of another communication station of the ESL system leads directly to the conclusion that another communication station exists, the transmission range of which extends as far as the one detecting the radio activities and that it is using the observed radio channel. This can be used to avoid using the affected radio channel by the receiving communication station or to change the radio channel for the other, specifically transmitting communication station, because the two communication stations are located spatially too close to one another and could or will interfere with one another when communicating by radio in the same radio channel.

In contrast, the knowledge that the established radio activity in the observed radio channel is exclusively attributable to radio signals of ESLs allocated to a communication station other than the receiving one can lead to the conclusion that the other communication station is positioned at a sufficient distance, and the radio signals directly emitted by it will probably not impede the reception of the ESP radio signal emitted by the ESLs which are allocated to the communication station currently detecting the radio activity. In this case, it is therefore established indirectly that there is in the vicinity a further communication station but the transmission range thereof is not sufficient to receive its radio signals directly at the communication station testing the radio channel. Rather, it is concluded that the other communication station exists because radio response signals from ESLs allocated to this other communication station can be perceived as a response to the radio signals (e.g. of the synchronisation data signal) of this other communication station. In this situation, it would in principle not be necessary to change radio channel. However, if the radio signals of such ESLs allocated to other communication stations accumulate, this can also be used as an indicator that it would be better to change the radio channel to avoid interference in the long term.

It can also be established with the aforementioned systematics whether the radio activity established in the relevant radio channel originates from one's own ESL system or whether the established radio activity originates from another, e.g. adjacent, ESL system. This situation can arise when two business premises are located next to one another and a separate ESL system is operated in each of the business premises. This other ESL system can be recognised e.g. by the fact that, with known systematics of the time slot communication method, radio activities of unknown communication stations and ESLs occur. As soon as this is established, the ESL system in which the measures according to the invention are implemented can carry out the radio channel assignment in order to reduce or avoid both interference by the radio signals originating in the spaces of one's own business premises and interference by other radio signals originating in the spaces of the other business premises.

To obtain a meaningful description of the radio activity in the radio channel in question, it has proven effective that the detection of the radio activity comprises a radio signal reception and a determination of a received signal strength indicator (RSSI for short) for the received radio signals. This can be implemented by the electronics of the receiving device in question.

The radio activities detected in the electronic display system for the radio channels in question are, as mentioned, transmitted to the central data processing device, where they are assigned in a three-dimensional digital model of the relevant business premises to the spatial positions at which they have been detected. A three-dimensional map of the radio activities in the business premises can thus be generated. Proceeding from this, the radio channel to be used by the communication station in question for radio communication with the electronic displays allocated thereto is defined by the data processing device such that radio channel activities other than those of the communication station in question or the electronic displays allocated thereto in the defined radio channel can be substantially disregarded. This is achieved substantially in that radio channels which are as far away from one another as possible in the relevant frequency band are selected for spatially adjacent communication stations. In particular when powerful WLAN radio activities are present in one or more of the ESL radio channels, the spatial distribution of the ESL radio channels to be used is rearranged such that even sidebands of the WLAN signals at the respective location of the electronic displays no longer play any role in the ESL radio channel to be used. If necessary, a changed WLAN radio channel assignment is also defined to solve the optimisation problem. Adjacent radio channels of a frequency band should therefore preferably be used geographically as far away as possible from one another. The assignment of the radio channels to be used in future at the communication stations is therefore optimised in this aspect, wherein, as already mentioned, the radio channel assignment of the WLAN radio systems which usually dominate in terms of their radio signal level can be influenced in order to minimise or as far as possible suppress their interference potential. In summary, this optimisation process leads from the current local actual distribution of the radio channels used to a future local target distribution of the radio channels to be used. In the process, a new radio channel to be used is defined by the data processing device for the device in question, that is, for the communication station and also if necessary for the combination communication station, which is represented by radio channel definition data.

To make the newly defined radio channel, that is, the radio channel to be used in future, available to the relevant device, the definition of the radio channel to be used comprises transmitting the radio channel definition data, which can be used at the communication station to set the radio channel to be used, to the communication station. In this connection, it should be mentioned that if the currently used radio channel and the radio channel to be used in future are identical, the transmission of the radio channel definition data to the relevant device can be omitted.

The same also applies, mutatis mutandis, to affected WLAN access points or WLAN communication modules to which the WLAN radio channel to be used is communicated after it has been defined by the data processing device with the aid of said radio channel definition data, which results in a channel switchover there.

If a communication station then receives an instruction to use a radio channel other than the currently used one, it simply changes the radio channel. It loses the connection to its electronic displays in this moment. However, the affected electronic displays were already logged in or registered previously at the communication station. The affected electronic displays then scan the available radio channels until they find the relevant communication station again, which can take place with the aid of a unique communication station identifier, and connect again to it in this radio channel now used by the communication station. They are therefore not re-registered during this process. Rather, their registration is retained. Alternatively, it could be provided for the communication station to emit to the electronic displays allocated to it a command to change the radio channel, including the statement of the new radio channel, where necessary also stating a time chronologically specifying the change of radio channel or a time span before they change the radio channel themselves.

It has proven particularly advantageous when the detection of the radio activity and the transmission of radio channel activity data corresponding thereto are repeated chronologically. This makes it possible for the data processing device to carry out the definition of the radio channel to be used virtually continuously, that is, repeatedly during the operation of the electronic display system. The electronic display system can thus also respond to changed or changing radio framework conditions or environmental conditions during operation and carry out autonomous, that is, automatic radio channel assignment.

The question of when and whether and under what circumstances an update of the radio channel assignment should be carried out can depend on various factors.

For example, the radio activity in the radio channel in question can be detected and a check as to whether a change in the radio channel assignment is necessary can be carried out automatically at regular intervals. The regularity can relate to each time slot cycle or else to multiples of the time slot cycle, for example. Of course, another chronological relationship, such as minutes, hours, days, parts of days or else multiples of days etc. can also be used as the time basis for the regular detection and checking as to whether a new radio channel assignment is necessary. In this case, the procedure can be such that, after an established necessary change of the radio channel assignment, the necessity of a further change of the radio channel assignment is checked at shorter intervals until this is no longer recognised as necessary, because further changes are not predicted to result in any improvement in the reception situation. The frequency of the detection and checking is subsequently carried out at longer time intervals again. In particular the changeability of the time basis allows a necessary change of the radio channel assignment to be carried out as quickly as possible on the one hand, and, if there is no need for further fast changes, an energy-saving operation of the electronic displays to be ensured on the other hand.

Triggers for a radio channel assignment to be redefined can be a wide variety of circumstances which make a change of the radio channel assignment necessary. For example, the expansion of a radio infrastructure in business premises can act as a trigger for this, because it is suddenly established (by repeated automatic detection of the radio activity) that some electronic displays or else communication stations are receiving unacceptable interference signals in the radio channel used by them, to which the response should be an optimisation, that is, renewal of the radio channel assignment in the electronic display system so that these interference signals no longer occur or are at least minimised. A trigger for an update of the radio channel assignment can also be a change of equipment, such as an addition to, the reduction of or else the spatial displacement of shelving units to which electronic displays are fastened, because in this case too some of the electronic displays in their new positions can establish a changed radio activity in the radio channel used by them.

These and further aspects of the invention result from the figures discussed below.

BRIEF DESCRIPTION OF THE FIGURES

The invention is explained once more in detail in the following with reference to the attached figures on the basis of exemplary embodiments, to which the invention is not restricted, however. In the various figures, identical components are provided with identical reference signs. In the figures.

DESCRIPTION OF THE EXEMPLARY EMBODIMENTS

Figure 1:
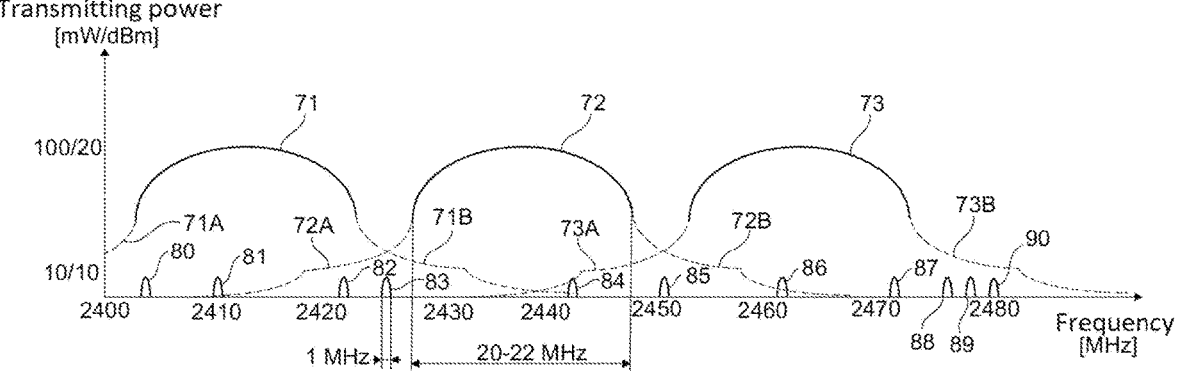
FIG. 1 schematically shows radio channels of a WLAN radio system and an ESL system in the 2.4 GHz band.
Figure 2:
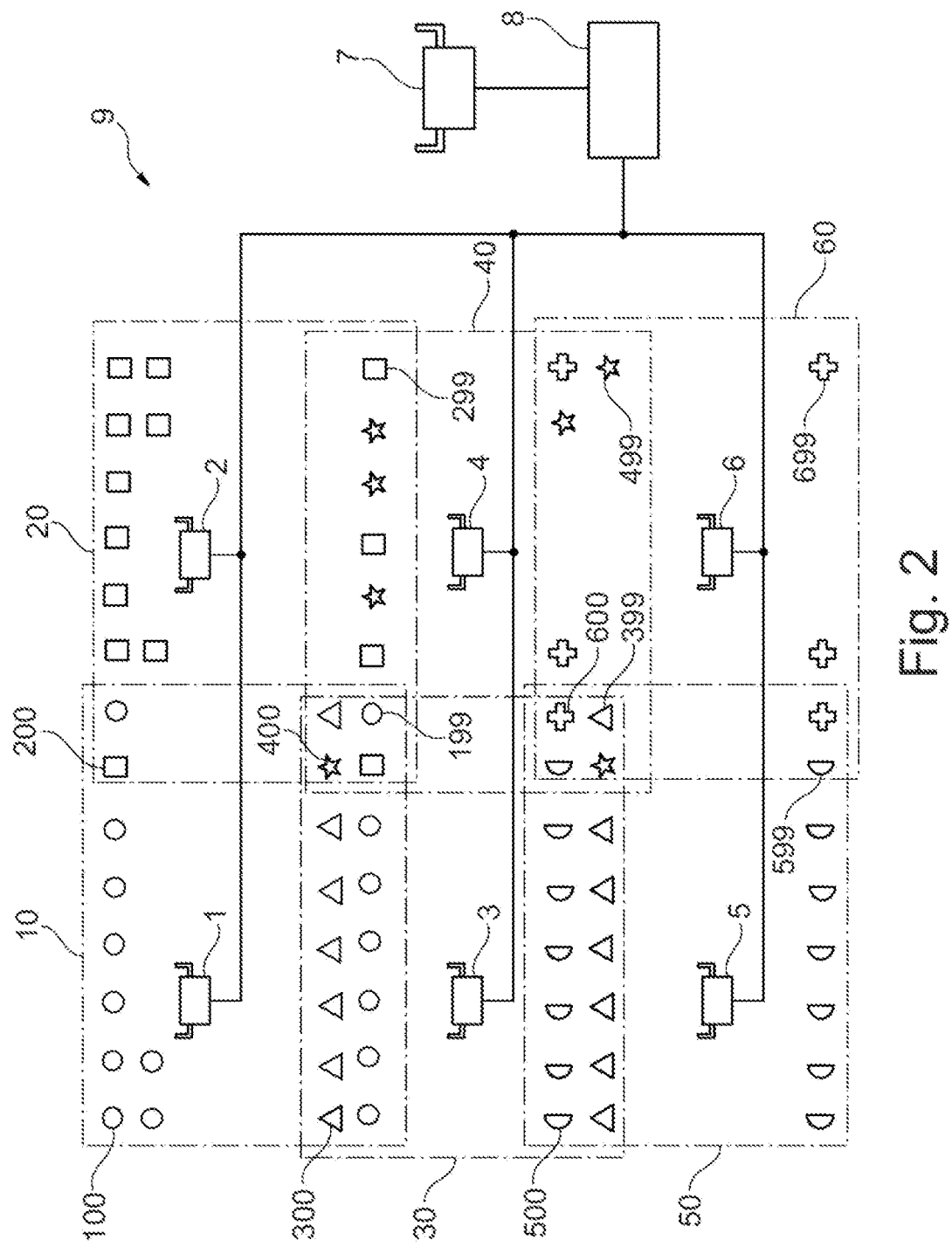
FIG. 2 schematically shows an electronic display system with ESL access points.

In FIG. 1, the radio channels in the 2.4 GHz frequency band which are used in conjunction with an electronic display system 9 (referred to below as system 9 for short), which is shown schematically in FIG. 2, are visualised by way of example. FIG. 1 therefore shows the frequencies from 2400 MHz to 2480 MHz along the x-axis and the transmitting power of a radio device or its radio signal in the range of 10 mW-100 mW and in the range of 10 dBm to 20 dBm along the y-axis.

In this frequency band, the first, sixth and eleventh Wi-Fi radio channels 71, 72 and 73 recommended by IEEE 802.11 are entered with the typical bandwidth of 20-22 MHz. The remaining Wi-Fi radio channels are not used according to the IEEE 802.11 recommendation and are therefore not entered. In addition, the respective upper and lower sidebands 71A and 71B, 72A and 72B, and 73A and 73B are indicated schematically for each of the Wi-Fi radio channels 71-73.

Furthermore, the display radio channels, ESL radio channels below for short, available for electronic displays 100-699 (see FIG. 2) are entered from the zeroth to the tenth ESL radio channel 80-90 with their bandwidth of 1 MHz. Although the preferred ESL radio channels, specifically the third 83, fifth 85, eighth 88, ninth 89 and tenth 90, are outside the bandwidth of the three recommended Wi-Fi radio channels 71, 72 and 73, it is clear from FIG. 1 that if the local configuration in the system 9 is unfavourable radio signals in the said preferred ESL radio channels 83, 85, 88, 89 and 90 are covered by powerful sideband signals of the recommended Wi-Fi radio channels 71, 72 and 73. This problem is solved by the present invention, which is described in detail below.

An exemplary configuration of the system 9 is explained below using FIG. 2.

FIG. 2 shows a data processing device 8, referred to below as server 8 for short, a WLAN access point 7 which is connected in a wired manner thereto and can use the mentioned recommended three Wi-Fi radio channels 71-73, six communication stations 1-6, referred to below as ESL access points 1-6 for short, which are likewise connected in a wired manner to the server 8.

In this case, the first Wi-Fi radio channel 71 is allocated to the WLAN access point 7.

When the system 9 was installed, the ESL access points 1-6 were put into operation sequentially, wherein the respective ESL access point 1-6 carried out a check of the five ESL radio channels 83, 85, 88, 89 and 90 preferred, that is, located outside the recommended Wi-Fi radio channels, for assignment or use by another ESL access point 1-6, and the first available (free, that is, not used by another ESL access point) ESL radio channel 83, 85, 88, 89 or 90 was selected for its own radio traffic. Thus, according to this example, the third ESL radio channel 83 is used by the first ESL access point 1, the fifth ESL radio channel 85 is used by the second ESL access point 2, the eighth ESL radio channel 88 is used by the third ESL access point 3, the ninth ESL radio channel 89 is used by the fourth ESL access point 4, the tenth ESL radio channel 90 is used by the fifth ESL access point 5, and the third ESL radio channel 83 is used by the sixth ESL access point 6.

Furthermore, FIG. 2 shows a relatively large number of electronic displays, referred to below as ESL for short, 100-199, 200-299, 300-399, 400-499, 500-599 and 600-699. The ESLs 100-699 are combined into groups 10, 20 etc. to 60 and labelled with different symbols (circle, square, triangle, star, semicircle and cross), which are clustered substantially around the position of the ESL access points 1-6, wherein a spatial overlap of the groups 10-60 can exist in the edge regions, as can be seen in FIG. 2. In this example, one hundred of the ESLs are always provided per group 10-60 for the sake of simplicity, but the number of ESLs used in practice can be different in particular from group to group and can of course differ from the value used here.

The first group 10 is allocated in radio terms to the first ESL access point 1, the second group 20 is allocated in radio terms to the second ESL access group 2 etc. up to the sixth group 60, which is allocated in radio terms to the sixth access point 6. This radio allocation was established during installation or commissioning of the system 9, in which the respective ESLs 100-699 have logged into the respective best possible ESL access point 1-6 available by radio. For example, the selection of the preferred ESL radio channel

83, 85, 88, 89, 90 which has the strongest radio signal can be used as the criterion for the best possible radio availability.

It should be mentioned here that a rectangle with a discontinuous line has been selected to visualise the groups 10-60. However, this is only for schematic representation. In a real grouping, there would usually be a three-dimensional distribution of the ESLs 100-699 etc. around their respective ESL access points 1-6, which has been omitted here for the sake of clarity.

Figure 3:
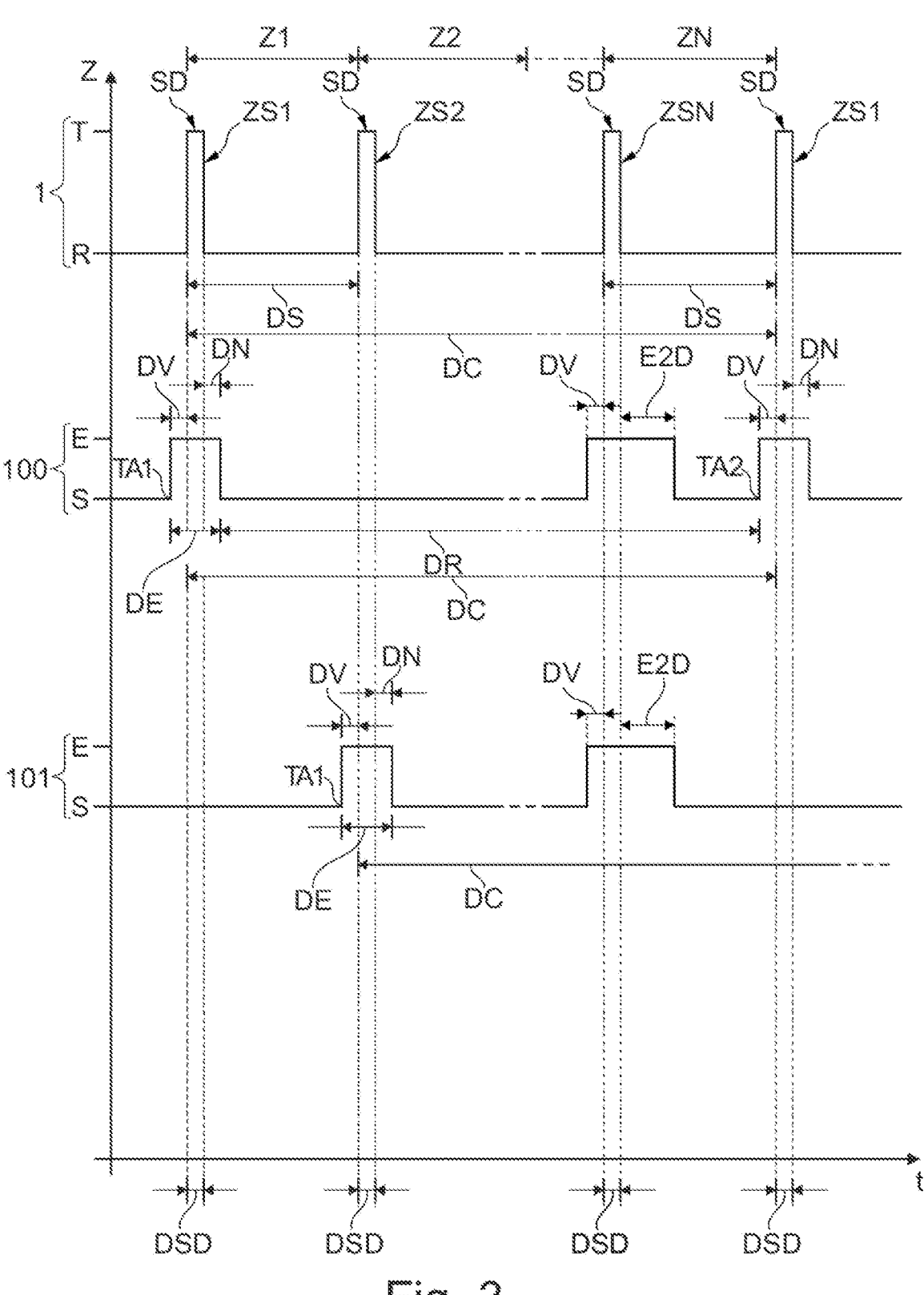
FIG. 3 schematically shows a proprietary time slot communication method provided by the ESL access points.

In the present case, the communication of the ESL access points 1-6 with the respectively allocated ESLs 100-699 takes place using the proprietary time slot communication method already discussed in the general description, the structure and time systematics of which are visualised in FIG. 3. Only the first ESL access point 1 and two of its ESLs 100 and 101 are discussed here by way of example and for reasons of clarity.

In FIG. 3, the top state sequence shows the states Z of the first ESL access point 1. During a time slot cycle duration DC (e.g. 15 seconds), N time slots Z1 . . . ZN (e.g. 256) with identical time slot durations DS (e.g. approximately 58 milliseconds) are available. During the time slot cycle duration DC changes the first ESL access point 1 between a transmitting state T and a rest state R. The transmitting state T is always assumed at the start of a time slot Z1 . . . ZN and is maintained for a synchronisation data signal duration DSD (or transmission time duration DSD of the synchronisation data signal SD) in order to transmit the respective applicable time slot symbol ZS1, ZS2, . . . ZSN with the respective synchronisation data signal SD. The serial number of the respective time slot Z1 . . . ZN in the order of occurrence of the time slot Z1 . . . ZN is used by way of example here as the respective time slot cycle symbol ZS1 . . . ZSN to identify the respective time slot uniquely. Consequently, the first time slot Z1 is labelled in hexadecimal notation (labelled "Hex") with the time slot symbol Hex 00, the second time slot Z2 is labelled with the time slot symbol Hex 01 etc., and the last time slot ZN (in the present example the 256th time slot Z256) is labelled with the time slot symbol Hex FF.

In the present exemplary embodiment, a time slot occurring in the time slot communication method and defined for the respective ESL 100-199 is identified with the aid of the lowest value byte B0 of the unique hardware address of the ESL 100-199 at the respective ESL 100-199. With the exception of the lowest value byte B0, the remaining three bytes B1-B3 of the hardware address are used to address an ESL 100-199 individually in the time slot Z1 . . . ZN defined for the respective ESL 100-199 in order for example to transmit data or to communicate commands to the ESL 100-199, which are then executed.

FIG. 3 shows that the first ESL 100 is in the more synchronous state. It wakes from its sleep state S at a first wake-up time TA1 and changes with a relatively short lead time DV before an expected occurrence of a synchronisation data signal SD into its ready-to-receive active state E, receives the synchronisation data signal SD during a receiving time duration DE with the first time slot symbol ZS1 (Hex 00), establishes by comparison of the lowest value byte B0 of its hardware address (Hex 00) with the received time slot symbol ZS1 that the first time slot Z1 defined for the first ESL 100 is indicated (correspondence of the bytes to be compared: B0 of the hardware address and first time slot symbol ZS1), retains the parameters of the time control stage 33 used to control the waking for waking in the subsequent time slot cycle for the purpose of defining the new wake-up time, and changes with a relatively short lag time DN back into the sleep state S in order to wake up after the intended sleep state dwell time DR has passed according to plan at the new (second) wake-up time TA2 with the said lead time VD before the new start of the first time slot cycle Z1. The same applies analogously to the second ESL 101, which, like the first ESL 100, is in the synchronous state. With the aid of these systematics, the ESLs 100-699 can be kept in the synchronous state in the most energy-efficient way possible and are also available for communication with their ESL access points 1-6 within their respective time slot.

Furthermore, the ESLs 100-699 are programmed such that they are also active outside their own time slot, specifically in the last time slot ZN, as is shown for the two ESLs 100 and 101 in FIG. 3. However, only the receiving state is present there.

In the present case, all ESLs 100-199 allocated to the first ESL access point 1 wake up promptly on the occurrence of the last synchronisation data signal SD of the last time slot ZN of the time slot cycle and in the process receive the last time slot symbol ZSN, identify the last time slot ZN on the basis of the serial number to verify their synchronism again, and check the radio activity in the ESL radio channels zero 80 to ten during the detection duration E2D within the last time slot ZN, and store the detected radio channel activity in the form of radio channel activity data FAD for later transmission to the first ESL access point 1. A part of the time slot duration DS or else the entire time slot duration DS (where necessary minus the lead time DV) can be used as the detection duration E2D.

The ESL access points 1-6 are preferably programmed such that no further emission takes place after the emission of the synchronisation data signal SD, that is, there is no communication in the last time slot ZN. This ensures that no self-induced signal emission distorts the detected radio activity, which is supposed to indicate only externally caused radio activities.

To ensure the most complete detection possible of the radio activity in the ESL radio channels 80-90, the process of detection for different ESL radio channels 80-90 can extend over multiple time slot cycles, wherein for example only a single ESL radio channel or a small number of ESL radio channels 80-90 is checked for radio activity for each time slot cycle. In particular, the process of detection is repeated (e.g. every M time slot cycles, wherein M is a natural number, e.g. every 5, 10 or 50 time slot cycles), in order to establish a current overall picture of the radio activity continuously for all the available ESL radio channels 80-90. The time curve in which the radio activity is detected for all the ESL radio channels 80-90 is referred to below as detection period.

Since both the ESL access points 1-6 and the ESLs 100-699 known about the time conditions or in other words in particular the timing of this detection period, the radio activities detected individually at the position of the ESLs 100-699 in the respective ESL radio channel 80-90 can be actively retrieved after the detection period has elapsed by the ESL access points 1-6 from the ESLs 100-199 to 600-699 allocated to them, for example by means of a command. This then leads to a data transmission from the respective ESL 100-699 to the corresponding ESL access point 1-6, wherein the data transmission can take place either in the time slot Z1-ZN to which the relevant ESL 100-699 is allocated or in a data transmission across time slots Z1-ZN, depending on the amount of data. The entire amount of data to be transmitted can be spread over different time slots Z1-ZN, where necessary also transmitted distributed over multiple time slot cycles.

In the case of FIG. 3, the radio channel activity data FAD could be transmitted e.g. in the first time slot Z1 for the first ESL 100 and in the second time slot Z2 for the second ESL 101, but this is not shown in detail. For this, the respective ESL 100 or 101 would be addressed individually with the aid of the synchronisation data signal SD and requested to transmit data by a query command received from the first ESL access point 1. The same applies analogously to all the other ESL access points 2-6 and all the other ESLs 102-699.

The radio channel activity data FAD transmitted by radio to the ESL access points 1-6 are then transmitted from the ESL access points 1-6 to the server 8 and stored there with a reference to the respective position of the relevant ESLs 100-699 to produce a digital three-dimensional map of the radio activities for each ESL radio channel. It should be mentioned here that the server 8 stores information relating to the position of products in the business premises to which the individual ESLs 100-699 correspond, from which the approximate position of the ESLs 100-699 can also be defined.

On the basis of this mapping of the radio activities, an optimisation of the radio channel assignment for each ESL access point 1-6 takes place in the server, in which it is made sure that the respective group 10-60 of ESLs 100-699 can communicate by radio as well as possible with the respective ESL access point 1-6, that is, that the radio signals of the ESLs 100-699 can received with the highest possible signal strength, in particular without superimposition of other radio signals, at the relevant ESL access point 1-6. Therefore, the ESL radio channel zero 80 to ten 90 to be used in future, in particular limited to the ESL radio channels three, five, eight, nine or ten to be used by preference, is defined for each ESL access point 1-6 and then transmitted in a wired manner to the respective ESL access point 1-6 in the form of radio channel definition data.

The radio channel definition data are received at the ESL access points 1-6 and, if a channel switchover is necessary, switched to the newly defined ESL radio channel 80-90. The ESLs 100-699 of the relevant ESL access point 1-6 automatically follow this new radio channel assignment, that is, the change of the ESL radio channel 80—because they lose the connection to their ESL access point 1-6, find it again in their own search sequence through the ESL radio channels 80-90, and connect to it again and resynchronise with it.

An optimised local distribution of the use of the ESL radio channels 80-90 in the system 9 thus results in relation to the locations of the ESLs 100-699. This can be repeated at certain time intervals, in particular at substantially periodic time intervals, as a result of which a radio channel assignment adapted to the respective radio framework conditions (interference signal from other radio devices, radio shadowing etc., as well as changed local location of the ESLs 100-699 etc.) results over the operating time of the system, which radio channel assignment ensures reliable radio traffic between the ESLs 100-699 and their respective ESL access point 1-6.

Figures 4, 5:
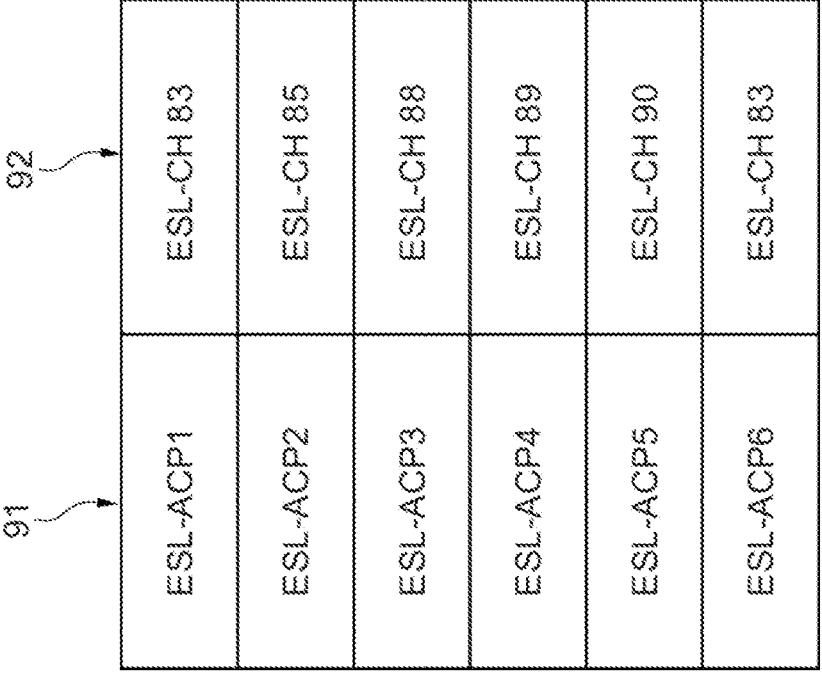
FIG. 4 schematically shows an initial first radio channel assignment for the ESL access points.
FIG. 5 schematically shows a changed second radio channel assignment for the ESL access points.

FIG. 4 shows the radio channel assignment before the optimisation process, and FIG. 5 shows the optimised radio channel assignment, in table form. In these tables, a first column 91 contains the ESL access points 1-6, which are abbreviated as ESL-ACP in combination with their respective reference sign 1-6, and a second column 92 contains the ESL radio channel 80-90 used by the respective ESL access point 1-6 and abbreviated as ESL-CH in combination with the respective reference sign 80-90.

As can be seen clearly, the use of directly adjacent ESL radio channels 88, 89 and 90 by the second, third and fourth ESL access points 3, 4 and 5 in the original radio channel assignment was rather disadvantageous, and the vicinity of the third ESL radio channel 83 used by the sixth ESL access point 6 to the first Wi-Fi radio channel 71 used by the WLAN access point 7 was also extremely unfavourable. These unfavourable conditions were rectified by optimising the radio channel assignment to the effect that ESL access points 2, 4, 6 positioned in the immediate local vicinity of the WLAN access point 7 now use the eighth and tenth ESL radio channels 88 and 90 thus are not operated in immediately adjacent ESL radio channels, and also the largest possible frequency distance from the upper sideband 71B of the first WLAN radio channel 71 is present. The ESL access points 1, 3 and 5 located further away from the WLAN access point 7 now use the ESL radio channels 83, 85 and 83, because the upper sideband 71B no longer has any negative influence at their position and at the position of the allocated ESLs 100-199, 300-399 and 500-599. Furthermore, it was ensured that no directly adjacent ESL radio channels are used, in particular in comparison with the other ESL access points 2, 4 and 6. In this example, it would however also be possible for the ESL access point 5 to use one of the not preferred ESL radio channels, for example the ESL radio channel 87 located in the range of the end of the frequency band, rather than the ESL radio channel 83 already used by the ESL access point 1.

It can also be provided in the system 9 for the radio channel assignment to proceed in two stages. For example, in a first step, the radio activity for the ESL radio channels 80-90 can be detected with the aid of the ESL access points 1-6 and transmitted to the server 8, after which a new assignment of the ESL radio channels 80-90 to be used in future is defined for the ESL access points 1-6 and transmitted to same so that the ESL access points 1-6 change the assignment of the ESL radio channels 80-90 used by them if necessary. Then, in a second step, the radio activity in the ESL radio channels 80-90 at the location of the individual ESLs 100-699 can be detected and transmitted via the ESL access points 1-6 to the server 8, and the assignment of the radio channels to the ESL access points 1-6 can be changed further in order to obtain fine tuning of the radio channel assignment.

Furthermore, the detected radio activity at the location of the respective ESL access point 1-6 and at the location of the respective ESLs 100-699 can also be considered in combination in the system. For this, the radio activity is detected both by the ESL access points 1-6 at their respective location and by the ESLs 100-699 at their respective location and transmitted to the server 8, which then determines a local optimisation of the assignment of the channel assignment for the ESL access points 1-6 taking into account all these radio activities.

It has proven particularly advantageous when, instead of the separate WLAN access point 7, at least one combination communication station (not shown) is used in the system 9, said combination communication station combining an ESL access point and a WLAN access point in one device, wherein there is a software interface between the two software drivers implementing the functionality of the respective access point type. The software interface can then be used to query and detect the WLAN radio channel used by the WLAN access point and subsequently also, where necessary, after optimisation of the radio channel assignment is complete, to change not only the ESL radio channel in the combination communication station but also the WLAN radio channel used by the integrated WLAN access point.

In summary, these measures result in a system 9 in which the radio channel assignment can be changed for the ESL access points, where necessary also for WLAN access points combined therewith in one device, even during operation, that is after initial radio channel assignment, and also can be further changed quasi-continuously in order to ensure the radio connection to the usually less powerful ESLs 100-699 or subsequently also to improve or optimise it.

Finally, it is once more pointed out that the figures previously described in detail are only concerned with exemplary embodiments, which can be modified in many different ways by the person skilled in the art, without leaving the scope of the invention. For the sake of completeness, it is also pointed out that the use of the indefinite article "a" or "an" does not mean that the relevant features cannot also be present multiple times.

The invention claimed is:

1. A method for radio channel assignment in a system, the system comprising a data processing device, communication stations, and electronic displays, and each of the communication stations being designed to use a radio channel defined by the data processing device for radio communication with a plurality of the electronic displays, the method comprising the following method steps, specifically:

defining the radio channel to be used on the basis of radio channel activity data which are transmitted by a first communication station among the communication stations to the data processing device and describe a detected radio activity in the radio channel in question, characterised in that the first communication station is used to transmit the radio channel activity data at a time after the first communication station has established an initial connection with at least one of the electronic displays by using a radio channel, wherein the radio channel activity data describe the detected radio activity after said initial connection has been established, wherein the first communication station comprises a first radio communication module for radio communication with the electronic displays according to a first communication protocol, and a second radio communication module for radio communication according to a second communication protocol, different from the first communication protocol, for radio communication with devices other than the electronic displays, wherein the radio activity is detected at the first radio communication module by querying radio channel use from the second radio communication module via a hardware interface and/or software interface.

2. The method according to claim 1, wherein the detected radio activity in the radio channel is detected with the aid of the first communication station at the location of the first communication station.

3. The method according to claim 2, wherein the first communication station selects a radio channel and receives radio signals in the selected radio channel in order to detect the radio activity.

4. The method according to claim 1, wherein the data processing device defines both a first radio channel to be used by the first radio communication module and a second radio channel to be used by the second radio communication module, wherein the second radio channel substantially does not overlap with the first radio channel.

5. The method according to claim 1, wherein a radio activity in a radio channel is detected with the aid of an electronic display at the location of the electronic display in question, and the radio activity present at the location of the electronic display in question is transmitted to the data processing device as radio channel activity data together with a display identifier identifying the electronic display in question via the communication station to which the relevant electronic display is allocated.

6. The method according to claim 5, wherein the radio communication between one of the communication stations and the electronic displays allocated thereto takes place according to a time slot communication method, in which, in a repeating sequence, a number of time slots per time slot cycle, in particular a fixed number, are available for communication between the one of the communication stations and the electronic displays allocated thereto, and each time slot is labelled with a unique time slot symbol, wherein, owing to the use of the time slot symbol, each electronic display is allocated exactly one time slot in order to autonomously establish synchronism with the one of the communication stations and to communicate with the one of the communication stations as required, wherein a radio activity in a radio channel is detected with the aid of an electronic display during a time slot.

7. The method according to claim 6, wherein a radio activity in a radio channel is detected with the aid of one of the electronic displays in a time slot which is unused in terms of communication between the one of the communication stations and the electronic displays allocated thereto, which also include the electronic display carrying out the detection of the radio activity.

8. The method according to claim 6, wherein a radio activity in a radio channel is detected with the aid of one of the electronic displays in a predefined time slot.

9. The method according to claim 8, wherein the predefined time slot is the last time slot of the time slot cycle.

10. The method according to claim 6, wherein the radio activity detected at the relevant electronic display for one or more different channels is stored with the aid of the radio channel activity data.

11. The method according to claim 10, wherein the radio channel activity data stored for the relevant electronic display is transmitted to the communication station in the time slot allocated to the relevant electronic display.

12. The method according to claim 10, wherein the one or more different channels are predefined.

13. The method according to claim 1, wherein the detection of the radio activity comprises a radio signal reception and a determination of a received signal strength indicator (RSSI for short).

14. The method according to claim 1, wherein the radio channel to be used by the communication station in question for radio communication with the electronic displays allocated thereto is defined by the data processing device such that radio channel activities other than those of the communication station in question or the electronic displays allocated thereto in the defined radio channel can be substantially disregarded.

15. The method according to claim 1, wherein the definition of the radio channel to be used comprises transmitting radio channel definition data, which can be used at the communication station to set the radio channel to be used, to the communication station.

16. The method according to claim 1, wherein the detection of the radio activity and the transmission of radio channel activity data corresponding thereto are repeated chronologically.

17. The method according to claim 1, wherein the second radio communication protocol is a WLAN communication module, or the second communication protocol is ZigBee or Bluetooth.

18. An electronic display system, which comprises: electronic displays, communication stations, each of the communication stations being designed to use a defined radio channel for radio communication with a plurality of the electronic displays, and a data processing device which is designed to define the radio channel to be used by a first communication station among the communication stations on the basis of radio channel activity data which are transmitted by the communication stations to the data processing device and describe a radio activity in the radio channel in question, characterised in that the first communication station is designed to transmit the radio channel activity data at a time after the first communication station has established an initial connection with at least one of the electronic displays by using a radio channel, wherein the radio channel activity data describe a detected radio activity after said initial connection has been established, wherein the first communication station comprises a first radio communication module for radio communication with the electronic displays according to a first communication protocol, and a second radio communication module for radio communication according to a second communication protocol, different from the first communication protocol, for radio communication with devices other than the electronic displays, wherein the first radio communication module is configured to detect the radio activity by querying radio channel use from the second radio communication module via a hardware interface and/or software interface.

19. The system according to claim 18, wherein the second radio communication protocol is a WLAN communication module, or the second communication protocol is ZigBee or Bluetooth.

* * * * *